J. K. LOCKWOOD.
Circular-Saw.
No. 9,197. Reissued May 11, 1880.
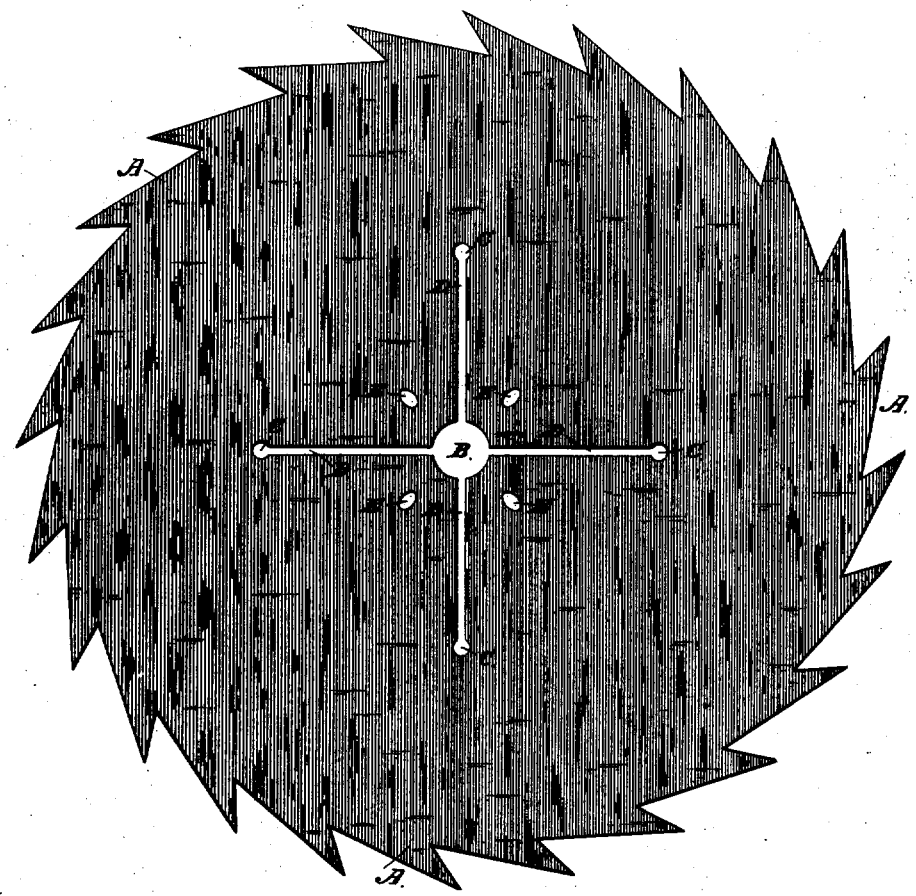
Attest:
Geo. F. Smallwood Jr.
W. E. Guy
Inventor:
James K. Lockwood
By Knight Bros.
Attys.

UNITED STATES PATENT OFFICE.

JAMES K. LOCKWOOD, OF ALPENA, MICHIGAN.

CIRCULAR SAW.

SPECIFICATION forming part of Reissued Letters Patent No. 9,197, dated May 11, 1880.

Original No. 70,728, dated November 12, 1867; Reissue No. 7,753, dated June 19, 1877; Reissue No. 8,076, dated February 5, 1878.
Application for reissue filed December 16, 1879.

*To all whom it may concern:*

Be it known that I, JAMES K. LOCKWOOD, of Alpena, in the county of Alpena and State of Michigan, have invented certain new and useful Improvements in Circular Saws, of which the following is a specification.

The object of my invention is to prevent the dishing, buckling, or other distortion of a circular saw by the heating and consequent unequal expansion of its parts. To prevent these effects I construct the saw with one or more parallel-sided slots or openings running outward from the eye, and form the eye larger than the mandrel on which it is to be mounted, and provide the saw with elongated or enlarged bolt or dowel holes, permitting the parts near the center to move radially in or out relatively to the collar and mandrel, so that in the event of expansion near the center the circular enlargement will be taken up by the radial slots and the radial enlargement by the contraction of the eye, and in the event of heating near the periphery the slots will open sufficiently to permit the saw to assume the increased diameter due to the expansion of its outer portion. Buckling is thus effectually prevented, and in the event of temporary dishing in passing through the log the saw is enabled to spring back instantly on leaving the log, and any permanent distortion is effectually prevented.

My invention further consists in forming enlargements at the extremities of the radial slots or openings to prevent cracking.

In the drawings, A represents a circular saw provided with an eye, B, by means of which the saw is to be mounted on a suitable mandrel. From this eye B a series of slots, D, extend outward, varying in width according to the size and uses of the saw, and terminating at any desired point between the eye and the periphery.

As in the rapid rotation of the saw it might occur that the saw would crack from the termination of these slots to the periphery, a series of circular holes, C, one at the termination of each slot, are punched in the saw to prevent such cracking.

E E are holes to receive dowel-pins, which pass from the permanent collar on the mandrel through the saw into the loose collar on the outside of the saw when hung. These holes, being larger radially than the bolts or dowels, permit the expansion and contraction of the saw from the center.

The eye B is made a little larger than the mandrel upon which it is intended to run, to allow for contraction and expansion of the saw.

A saw constructed as above described will never become wavy in its motion, and will never buckle, as in heating and cooling the expansion and contraction will be taken up and neutralized by the radial slots. The enlarged holes and the enlargement of the eye through which the mandrel passes are also advantageous in affording freedom for expansion in radial lines.

Having thus described my invention, the following is what I claim as new therein and desire to secure by Letters Patent:

1. A plane circular saw constructed with one or more parallel-sided slots or openings extending from the eye toward the periphery, for the purpose of preventing the distortion of the saw by expansion, substantially as set forth.

2. A circular saw constructed with any desired number of slots or openings extending from the eye toward the periphery and terminating in holes or enlargements, substantially as and for the purposes set forth.

3. A plane circular saw constructed with one or more slots extending from the eye toward but not to the periphery, and with radially-elongated bolt or dowel holes near the eye, as and for the purposes set forth.

4. A circular saw constructed with any desired number of slots or openings extending from the eye toward the periphery, terminating in holes or enlargements, and with elongated or enlarged bolt or dowel holes near the eye, substantially as and for the purposes set forth.

J. K. LOCKWOOD.

Witnesses:
WM. MIRRE,
A. E. FRENCH.